United States Patent

[11] 3,602,960

| [72] | Inventors | Walter Urbigkeit<br>Berlin;<br>Karl P. G. Baumann, Resse; Guenter<br>Ahrens, Langenhogen, all of, Germany |
|---|---|---|
| [21] | Appl. No. | 44,163 |
| [22] | Filed | June 8, 1970 |
| [45] | Patented | Sept. 7, 1971 |
| [73] | Assignee | Kabel-und Metallwerke<br>Gutehoffnungshutte Aktiengesellschaft<br>Hannover, Germany |

[54] CLAMP FOR MOUNTING ELLIPTICAL WAVEGUIDES
9 Claims, 4 Drawing Figs.

[52] U.S. Cl. .................................................. 24/249 LS,
333/98
[51] Int. Cl. .................................................. A44b 21/00,
H01p 1/04

[50] Field of Search .................................................. 24/243 RE,
249 LS, 243 DP; 343/772; 174/68 R, 68 C;
333/95, 95 A, 98; 138/96

[56] References Cited
UNITED STATES PATENTS

| 1,489,563 | 6/1924 | Morrison et al. | 138/96 |
| 2,346,854 | 4/1944 | McGee | 138/96 |
| 3,107,967 | 10/1963 | Sewell | 333/98 |

FOREIGN PATENTS

| 1,501,276 | 10/1967 | France | 24/249 LS |

*Primary Examiner*—Donald A. Griffin
*Attorney*—Smyth, Roston & Pavitt

ABSTRACT: A clamp for mounting elliptical waveguides and having two complementary parts defining a cylinder with elliptical cross section. Fastening means on the clamp have contour in accordance with a larger ellipse and an oblong slot for a bolt which may be aligned with the short axis as well as with the long axis of the ellipse of an inserted waveguide.

INVENTORS.
Walter Urbigkeit
Karl Paul Gustav Baumann
Günter Ahrens

ATTORNEYS

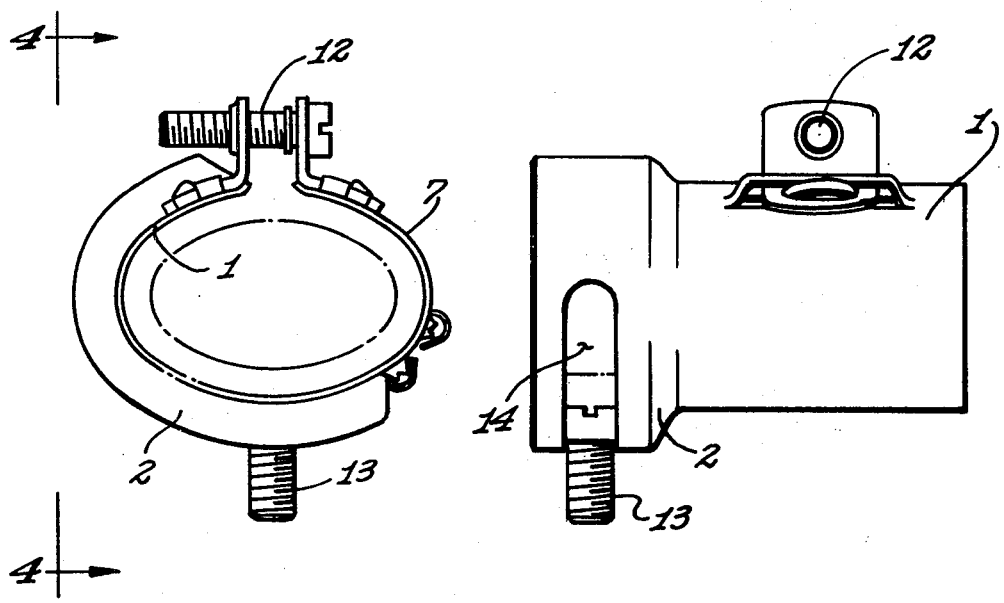

CLAMP FOR MOUNTING ELLIPTICAL WAVEGUIDES

The present invention relates to a clamp for mounting and positioning waveguides with elliptical cross section.

Electrical systems employing waveguides are often rather extensive so that it is required to assemble the system on location and to install the waveguides individually. For this, it is desirable to permit relative turning of the waveguide in or together with a mounting clamp, as connection to other equipment such as an antenna or the like may require particular orientation of the waveguide to be installed. However, mounting of waveguides with elliptic cross section poses significant problems.

It has been suggested to employ a circular clamp, and a particularly contoured clamping element is inserted in the circular clamp for adoption to the elliptical periphery of the waveguide. The inserted element is rotatably mounted in the clamp but does not permit axial displacement therein. The insert is, furthermore, made of an elastic and rather hard material. Upon installation, waveguide and insert are rotatable in unison relative to and inside of the clamp. However, it was found that material expenditure and, therefor, cost for such clamping and mounting structure is rather high. Moreover, it was found that during installation and mounting this particular clamp could rather easily crush the waveguide.

As an alternative to the aforementioned clamping and mounting structure, it has been suggested to employ two clamping elements, having complementary contour so as to complete mounting structure having elliptical cross section. The two elements are pivotally attached to each other and are dissimilar in size; one thereof has cross section to extend over about three-fourths of the ellipse, the other one completes the ellipse accordingly. The larger clamping element has one or two bores for receiving connecting elements such as bolts, screws, clamps or the like. These bores are usually located in the vicinity of smallest or of largest curvature of the ellipse.

Dual element clamps are less expensive than the clamps with adaptor insert mentioned above. However, during installation the waveguide cannot be turned in the elliptically contoured clamp to assume any desired position. Therefor, it is difficult to obtain proper angular orientation of the waveguide relative to its axis unless the locations for mounting the dual element clamps are selected so that the clamps can be mounted in different positions. However, the choice among available mounting positions and locations may be limited, and that, in turn, may be an undue constraint on available and permissible orientation of the waveguide to be mounted by and in that type of clamp.

The aforedescribed dual element clamp can be modified in that the larger one of the two clamping complementary elements is provided with an oblong slot extending over about one-fourth of the total perimeter of the ellipse. A bolt is used to secure the clamp to stationary support structure, and the shank of the bolt traverses the slot. It was found that upon employment of such a clamp waveguides could be mounted in desired position and orientation. However, it was found also that the slot weakened the structure of the clamp. The head of the bolt, traversing the slot for securing the clamp, does not hold the clamping element by engagement with an annular surface, instead fastening engagement is restricted to narrow portions at the edge of the clamping element adjacent the slot therein. Thus, the forces of interaction at the slot edges are quite high, and the bolt may readily be torn from the clamp.

The problem solved by the invention is to overcome the deficiencies outlined above. In accordance with the invention it is suggested to provide a pair of complementary clamping elements defining a clamp of cylindrical configuration with elliptical cross section. The two elements are dissimilar in size, one thereof extending over a larger portion of the ellipse. That larger one of the two elements is provided with a fastener and positioning strap extending over more than a quarter (angularly) of the ellipse. The positioning strap is oriented particularly to extend adjacently areas of the clamp element where the ellipse has smallest curvature, and the strap extends also to a point or area of largest curvature. The strap itself has elliptical configuration and is provided with an oblong slot. The slot has extension so that a fastener and positioning bolt, when inserted in the slot, may, at least approximately, align with the short axis of the ellipse or with the long axis thereof, or with any direction in the 90° range as defined by the two axes, i.e., in a quadrant of the ellipse. The bolt is used for securing and fastening the dual element clamp at proper orientation at the particular location of desired installation. As the oblong slot serves as a guide for the bolt (prior to tightening thereof) the assembled dual element clamp can, in fact, be turned about its central cylinder axis to assume any desired orientation, with or without inserted elliptical waveguide.

The positioning strap does not directly participate in the mounting of the waveguide but is a fastener element for the waveguide clamp proper. The primary object of the strap is to cooperate with a fastener bolt and due to its dimensions, the positioning strap is made to be sufficiently strong so that the fastener and positioning bolt head cannot be torn out of the strap. The dual element clamp with positioning strap is inexpensive and simple. Moreover, mounting and installation of the clamp to any stationary structure, frame etc. is rather easy, so is attaching of the clamp to a waveguide.

The larger clamping element may also have a slot registering with the slot of the positioning strap and extending over substantially the same angular range. This additional slot may be rather narrow, just wide enough to permit access to the screw driver slot in the head of the positioning bolt. The positioning strap itself may be mounted to the one clamping element by means of fastener straps or rivets. Alternatively, the positioning strap may be an integral part of that clamping element, particularly constituting a portion thereof having larger diameter, corresponding to a larger ellipse.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is an axial view of a modified clamp; and

FIG. 4 is a side view of the clamp of FIG. 3.

Figure 1:
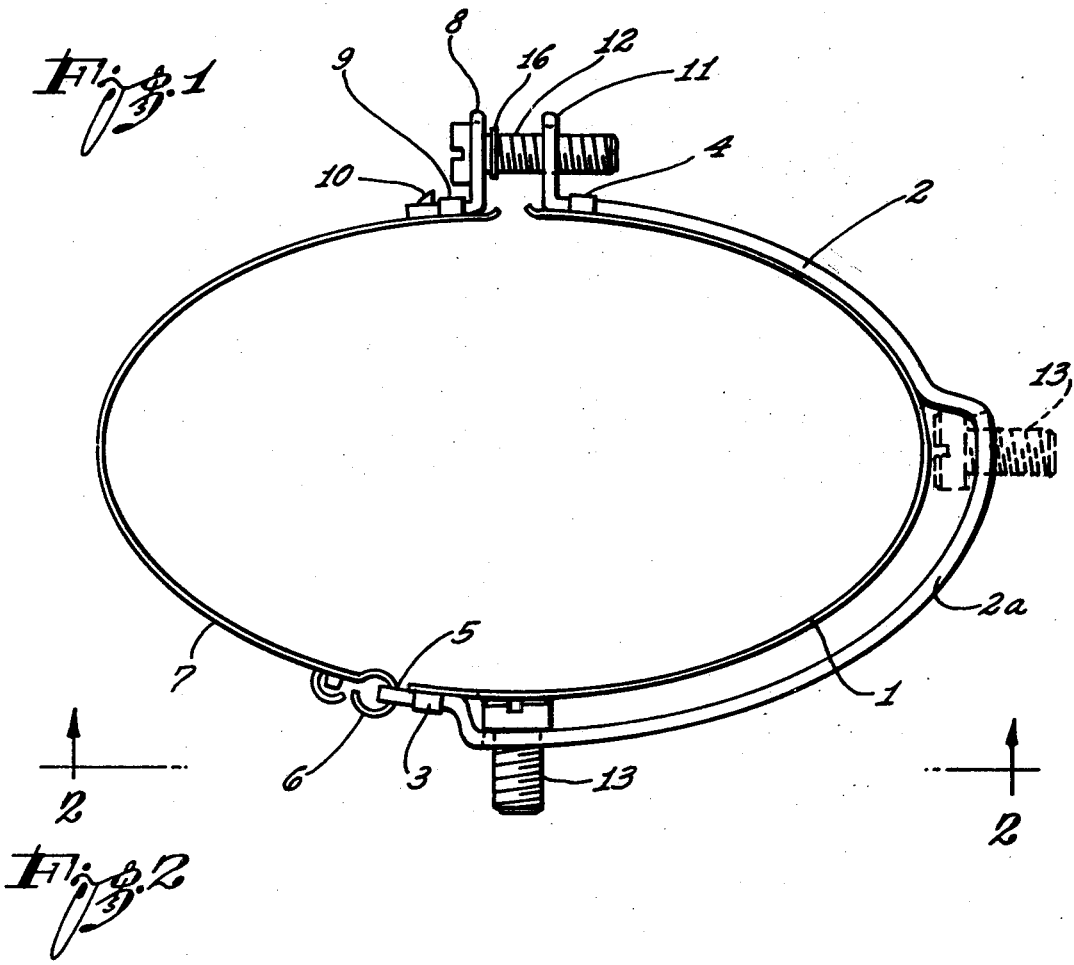
FIG. 1 is a view in axial direction of a clamp in accordance with the invention.
Figure 2:
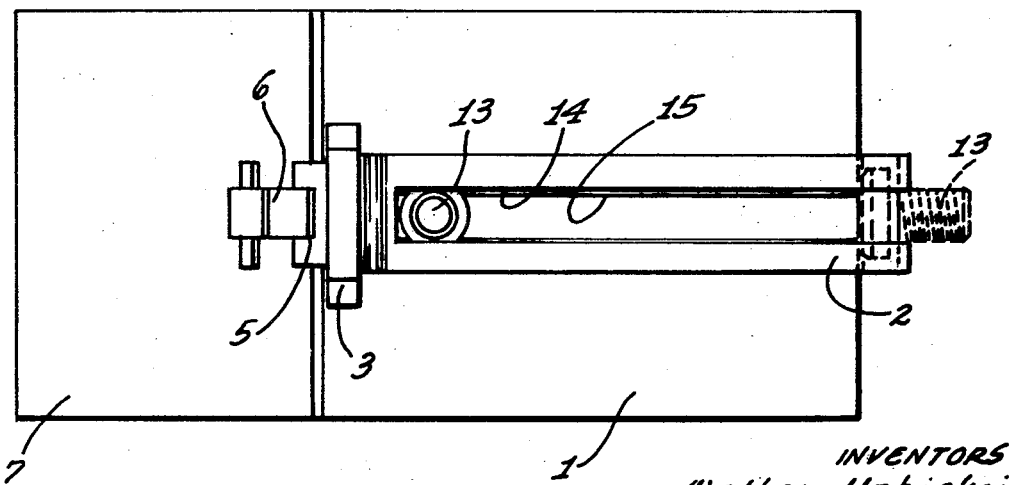
FIG. 2 is a top view of the clamp of FIG. 1.

Proceeding now to the detailed description of the drawings, in FIG. 1 and 2 thereof there is illustrated the preferred embodiment of the invention which includes a first clamp element 1 and a second clamp element 7. The elements, when assembled, have parallely extending wall structure and complementary contour to define a hollow cylinder with elliptical cross section, internally as well as externally. The two elements, when assembled as illustrated, serve as clamp for a waveguide with elliptical cross section. The longitudinal center axis of an inserted waveguide extends transverse to the plane of the drawing of FIG. 1. The two elements are of different size, in that element 1 extends over a larger portion of the ellipse, in any cross section transverse to the cylinder axis of the assembled clamp.

A strap 2 is mounted to element 1; particularly the two ends of the strap are fastened to element 1 by means of straps 3 and 4 respectively. Alternatively, strap 2 could be riveted to element 1. Positioning strap 2 is narrower in axial direction than element 1, but follows approximately the elliptical contour thereof. One end of strap 2 is provided with a slit, extending axially to the cylinder as defined by elements 1 and 7 and being traversed by tongue 6 extending from one end of smaller clamping element 7. Tongue 6 is folded back to establish a hinge. Thus, strap 2 is pivotally attached to clamping element 7 and, due to the crimped configuration of tongue 6 as inserted in slit 5 of strap 2, and due to the fact that strap 2 is strapped to element 1, the two clamp elements 1 and 7 are hinged to each other. Therefore, the clamp can be folded open and closed.

The other end of clamp element 7 is provided with an angle bracket 8 which is being fastened to element 7 by means of a strap 9; a barblike stop 10 limits the range of play of bracket on element 7. The adjacent end of strap 2 is provided with a bent off leg 11. Bracket 8 and leg 11 are provided with threaded bores. These bores register when the clamp is closed so as to permit insertion of a bolt 12 for tightening the clamp around an inserted waveguide. Strap 2, as fastened to clamp element 1 by means of strap 4 extends in abutment with the outer surface of element 1 for about a quarter of the ellipse. A different portion of strap 2, denoted 2a is provided to extend in spaced apart relation from the elliptical periphery of the clamping structure but following the contour thereof.

The strap portion 2a has an oblong aperture or slot 14 having width approximately equal to the diameter of the shank of a fastener bolt 13. The head of bolt 13 is retained in the space between element 1 and strap portion 2a. The aperture 14 is sufficiently long, so that the center axis of bolt 13 may be aligned with the short axis or with the long axis of the ellipse as defined, for example, by a section plane through the clamp 1–7 and through the centerline of slot 14. The bolt is shown in approximate alignment with the short axis of the ellipse which will also be the short axis of the ellipse of an inserted waveguide. The dotted position shows bolt 13 in near alignment of its axis with the long axis of the ellipse.

These two axes of the ellipse define two directions extending at right angles to each other, and the bolt 13 as retained between element 1 and strap 2 may assume position of alignment in any direction within a quadrant of the ellipse and as defined by the two axes. If the mounting location permits a choice between at least two different positions of securing bolt 13 which positions are apart by more than 90° in relation to the longitudinal center axis of the waveguide to be positioned, clamp and waveguide can be mounted in any angular position in relation to that longitudinal waveguide axis, i.e., the ellipse of the waveguide cross section can be oriented as to any direction of its axes and within the respective plane of extension transverse to the central waveguide axis. In order to provide protection against corrosion, the entire clamping structure, including the bolts 12 and 13, are hot galvanized and yellow bichromatized.

Installation and assembly proceeds as follows:

Assuming the clamp comes assembled as illustrated, bolt 12 is removed, thereby disconnecting elements 1 and 7 at that point. The bolt 13 is now used to connect the clamp to support structure, frame etc. in the particular location of installation. Element 1 has an elongated slot 15 which registers with slot 14 and has width sufficient for traversal by a screwdriver. In other words, the screwdriver slot in the head of bolt 13 becomes accessible for bolt tightening through slot 15. However, bolt 13 is not completely tightened at first, but merely inserted to establish sufficient support for the clamp and to permit positioning thereof to the extent oblong slot 14 permits relative shifting of bolt 13 therein.

Next, element 7 is folded up, i.e., pivoted about the hinge 5–6, to open the clamp and an elliptical waveguide is inserted. Now element 1 is oriented so that its elliptical contour matches the particular orientation of the elliptical waveguide. After having established the orientation of the clamp, the waveguide is carefully removed again and bolt 13 is tightened to tighten down the clamp. The waveguide is again placed into element 1, and element 7 is folded back to close the clamp. Bolt 12 is threaded into the aligned apertures in bracket 8 and leg 11, there having been placed a washer 16 on the bolt shank. As bolt 12 is carefully turned, the dual element clamp is tightened around the waveguide which now is firmly positioned in the clamp.

In FIGS. 1 and 2 strap 2 is fastened to clamping element 1 in about the middle as to its axial extension. However, a position of the strap closer to one end of the cylinder is likewise permissible. This aspect leads to the second embodiment illustrated in FIGS. 3 and 4. The larger clamping element 1 in this case is integral with a positioning element 20. In essence, the clamp positioning and orienting portion 20 is an elliptically contoured wall portion of element 1, but having larger diameter, i.e., the ellipse defined by portion 20 is larger than the cross section ellipse of the clamp proper. The bolt 12 traverses two separate brackets strapped to elements 1 and 7 respectively but being axially displaced from the widened portion 20 of element 1. Upon release of bolt 12 element 7 may be folded back, and now bolt 13 is directly accessible to the screwdriver.

The invention is not limited to the embodiments described above but all changes and modifications thereof not constituting departures from the spirit and scope of the invention are intended to be included.

We claim:

1. Clamp for mounting waveguides having elliptical cross section, comprising:
   a first clamp element and a second clamp element, the first and second clamp elements having complementary contour to define a cylinder with elliptical cross section;
   means for interconnecting the first and second clamp elements; and
   a fastener strap on one of the elements, the strap having elliptical contour but corresponding to a larger ellipse, the strap further having an oblong slot for insertion and positioning of a fastener bolt in at least approximate alignment with the short or with the long axis of the ellipse as defined by the clamp, for orientation of the bolt in a direction in a quadrant sector as defined by the two axes.

2. Clamp as in claim 1, the fastener strap being a separate element, mounted on the first element and secured thereto and providing on one end for hinged connection to the second clamp element.

3. Clamp as in claim 2, the other end of the fastener strap provided for bolting to a bracket on the second clamp element.

4. Clamp as in claim 1, the fastener strap being a separate element, the two clamp elements being dissimilar in size in that the first element extends over a larger circumference of the ellipse than the second element, the strap mounted to said first clamp element.

5. Clamp as in claim 4, the fastener strap mounted on said first elements, the first element having a slot in alignment with the slot of the fastener strap.

6. Clamp as in claim 4, the fastener strap being strapped to the first clamp element.

7. Clamp as in claim 4 the fastener strap being riveted to the first clamp element.

8. Clamp as in claim 1, the strap being an integral part of the first clamp element.

9. Clamp as in claim 8, the strap being defined as a portion of the first element on one axial end thereof, the portion having larger diameter.